(12) United States Patent
Vollmer et al.

(10) Patent No.: US 12,247,602 B2
(45) Date of Patent: Mar. 11, 2025

(54) FASTENING DEVICE AND METHOD FOR ITS MANUFACTURE

(71) Applicant: Illinois Tool Works Inc., Glenview, IL (US)

(72) Inventors: Gerit Vollmer, Linden (DE); Melanie Sindel, Nuremberg (DE); Albert Sbongk, Niederstetten (DE); Jan Müller, Würzburg (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/198,074

(22) Filed: May 16, 2023

(65) Prior Publication Data

US 2023/0375027 A1    Nov. 23, 2023

(30) Foreign Application Priority Data

May 18, 2022  (DE) ...................... 10 2022 112 526.2
May 2, 2023   (DE) ...................... 10 2023 111 231.7

(51) Int. Cl.
*F16B 21/08*  (2006.01)
*F16B 5/06*   (2006.01)

(52) U.S. Cl.
CPC ............ *F16B 21/086* (2013.01); *F16B 5/065* (2013.01)

(58) Field of Classification Search
CPC ......... F16B 21/086; F16B 5/065; B25B 11/00
See application file for complete search history.

(56) References Cited

U.S. PATENT DOCUMENTS

| | | | |
|---|---|---|---|
| 7,967,539 B2 | 6/2011 | Huet | |
| 2004/0253074 A1* | 12/2004 | Anscher | F16B 19/1081 411/45 |
| 2013/0280005 A1* | 10/2013 | Lepper | F16B 19/1027 411/15 |
| 2020/0391675 A1* | 12/2020 | Wang | F16B 5/0628 |

FOREIGN PATENT DOCUMENTS

| | | |
|---|---|---|
| DE | 202017105765 U1 | 10/2017 |
| DE | 102016008022 A1 | 1/2018 |
| EP | 2404067 B1 | 10/2015 |
| WO | 2012104250 A1 | 8/2012 |

* cited by examiner

*Primary Examiner* — David M Upchurch
(74) *Attorney, Agent, or Firm* — McAndrews, Held & Malloy, Ltd.

(57) ABSTRACT

A fastening apparatus for fastening a component to a carrier component includes: a bushing device having a bushing portion that delimits a receiving space for receiving a pin device; a pin device having a pin portion, wherein the bushing device and the pin device are formed from a first plastic component; and an outer casing wall of the bushing portion of the bushing device, the outer casing wall comprising at least one and preferably two diametrically opposed fastening portions for radially abutting against a recess of a carrier component, wherein each of the one or more fastening portions are formed from a second plastic component that is softer in comparison to the first plastic component.

16 Claims, 2 Drawing Sheets

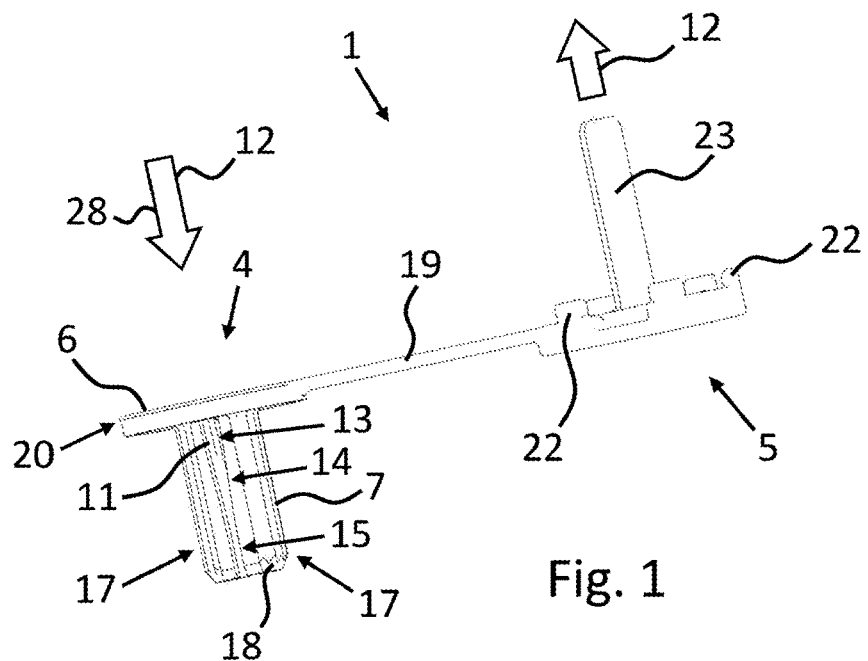
Fig. 1
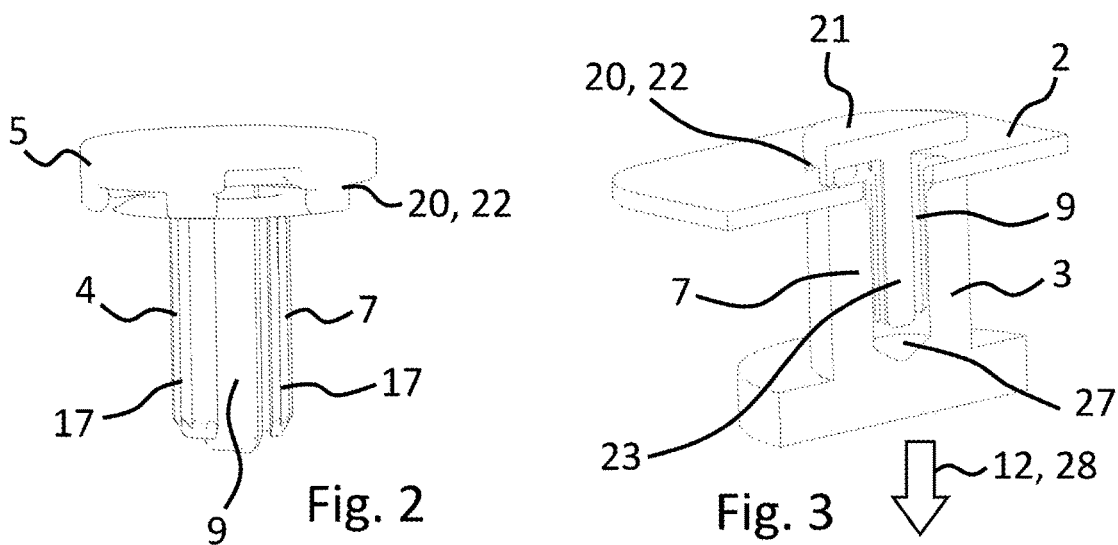
Fig. 2
Fig. 3
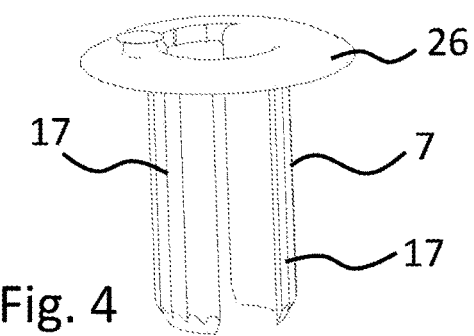
Fig. 4

FASTENING DEVICE AND METHOD FOR ITS MANUFACTURE

RELATED APPLICATIONS

The present application claims the benefit of German Patent Application Nos. DE 10 2022 112 526.2, filed May 18, 2022, and DE 10 2023 111 231.7, filed May 2, 2023, each titled "Fastening Device and Method for its Manufacture," the contents of which are hereby incorporated by reference.

BACKGROUND

Automotive components require fastening techniques that are simple to manufacture and assemble. Further, fastening techniques should above all be reliable and efficient. A blind, close-panel assembly is a condition where the fastening is focused between the panels being fastened to each other (such as automotive panels or other components), while trying to keep those same panels positioned very closely to each other.

DE 10 2016 008 022 A1 describes a fastening clip. The clip has a head and a shaft extending from the head along a longitudinal axis, in which at least two ribs are provided, wherein each rib extends from a base of the respective rib on the shaft to an end of the respective rib, radially spaced from the base of the respective rib.

U.S. Pat. No. 7,967,539 B2 discloses a fastening clip. This clip has a head and a shaft extending from the head along a longitudinal axis, in which six ribs are provided, wherein each rib extends from a base of the respective rib on the shaft to an end of the respective rib, radially spaced from the base of the respective rib. The collar belonging to the head is connected to the rib-supporting portion of the shaft via a cylindrical shaft. Further fastening apparatuses are known from EP 2 404 067 B1 and WO 2012/104250 A1.

DE 20 2017 105 765 U1 discloses a fastening apparatus. It has a housing, a spindle comprising a first and a second threaded portion with counter-rotating threads, and at least two clamping elements, which are respectively arranged between the spindle and the housing, wherein a first clamping element of the at least two clamping elements is coupled to the first threaded portion, wherein a second clamping element of the at least two clamping elements is coupled to the second threaded portion, and wherein the first and second clamping elements are clamped with a tapered region of the housing when the spindle and the housing move relative to one another.

Despite advancements to date, it would be desirable to provide an improved fastening apparatus and a method for the production of such a fastening apparatus.

SUMMARY

The present disclosure relates to a fastening apparatus as well as to a method for the production of such a fastening apparatus. A problem addressed by the present disclosure by providing a fastening apparatus, substantially as illustrated by and described in connection with at least one of the figures, as set forth more completely in the claims. In one example, the problem addressed by the present disclosure is to provide a fastening apparatus with which a component can be fastened to a carrier component, wherein the fastening apparatus is intended to offer an alternative to fastening apparatuses known from the prior art and is additionally simply constructed. A further problem addressed by the present disclosure is to provide a fastening apparatus that is secure and reliable in operation. In addition, a problem addressed by the present disclosure is to provide a fastening apparatus that allows for low assembly forces and/or high retaining forces.

In one example, a fastening apparatus is provided, in particular for fastening a component to a carrier component. It comprises a bushing device having a bushing portion that delimits a receiving space for receiving a pin device, and a pin device having a pin portion, wherein the bushing device and the pin device are formed from a first plastic component. In another example, there is further provided a method of producing a fastening apparatus as described above, wherein the fastening apparatus is produced from two different plastics by way of a two-component injection molding process, so that a bushing device and a pin device are formed from a first plastic component and fastening portions are formed from a second plastic component that is softer in comparison to the first plastic component.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1 illustrates a perspective view of a fastening apparatus according to the disclosure in a pre-assembly position.

FIG. 2 illustrates a perspective view of the fastening apparatus in a final assembly position, without the component and carrier component.

FIG. 3 illustrates a perspective side-cut view of the fastening apparatus in a final assembly position mounted in a carrier component with a component fastened by means of the fastening apparatus.

FIG. 4 illustrates a perspective view of the fastening portions of the fastening apparatus.

DETAILED DESCRIPTION

Figure 5:
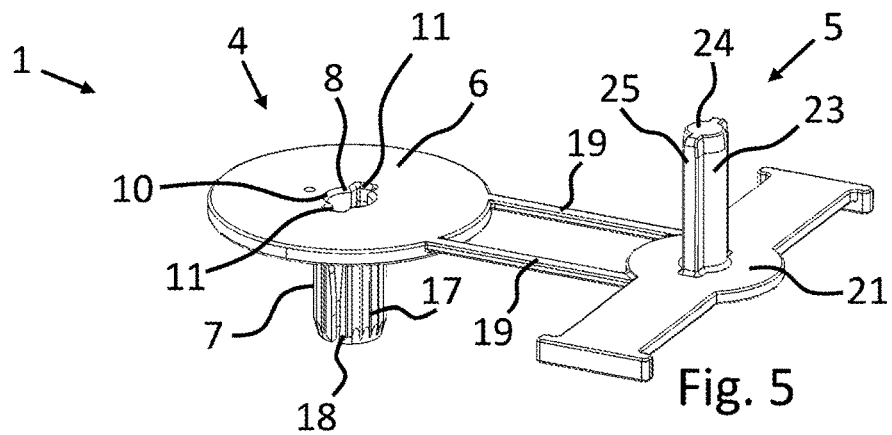
FIG. 5 illustrates a perspective view of the fastening apparatus according to the disclosure in a pre-assembly position.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first,"

"second," "top," "bottom," "side," "front," "back," "upper," "lower," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The present disclosure relates to a fastening apparatus as well as to a method for the production of such a fastening apparatus. In one example, disclosed is a fastening apparatus where an outer casing wall of the pin portion of the pin device comprises at least one and preferably two diametrically opposed fastening portions for radially abutting against a recess of a carrier component, wherein the fastening portions are formed from a second plastic component that is softer in comparison to the first plastic component.

Due to the construction according to the disclosure, the pin portion of the pin device can be inserted into a recess easily and with low assembly forces, in particular in a through-opening or a blind hole (bore).

Due to the fact that, by means of the pin device, the at least one fastening portion can be expanded in the radial direction and the fastening portion is formed from a second plastic component (soft component) that is softer in comparison to the first plastic component (hard component), relatively high retaining forces can be achieved by means of the fastening apparatus according to the disclosure. The softer second plastic component can also contain sticky material or a corresponding sticky coating in order to increase the frictional forces.

The fastening apparatus according to the disclosure can in particular be configured as a blind hole fixation for recesses or bores having a small diameter.

By means of the fastening apparatus, a component can be fastened to a carrier component in a clamping manner. Additionally and/or alternatively, components to be fastened to the pin device can also be arranged or integrally connected thereto, or corresponding retaining devices, such as cable or conduit holders, can be molded onto the pin device in order to connect it to a carrier component by means of the fastening apparatus.

Due to the fact that the fastening portions are produced from a soft component or a second plastic component that is softer than the first plastic component, relatively high frictional forces occur between the fastening portions and a recess of a carrier component, which ensure a secure and reliable fixation of the pin portion of the fastening apparatus in a carrier component.

The fastening portions can be exposed to a force acting outwardly in the radial direction by arranging the pin portion of the pin device in the receiving space of the bushing device, wherein the fastening portions can preferably extend in the axial direction.

By means of the pin portion of the pin device, the bushing portion of the bushing device and the fastening portions molded thereon are expanded in the radial direction in order to securely connect the fastening apparatus to a recess of a carrier component.

By removing the pin portion of the pin device from the receiving space of the bushing device or by exposing the fastening apparatus to a force acting counter to the assembly direction or in the axial direction of the fastening apparatus, the fastening apparatus according to the disclosure can also be easily disassembled.

The bushing portion of the bushing device can comprise at least one and preferably two diametrically opposed expansion grooves extending in the axial direction, which are preferably arranged in the region between the fastening portions, wherein the expansion grooves can be at least partially configured so as to taper conically in the axial direction.

By providing the expansion grooves, an expansion of the bushing portion of the bushing device in the radial direction is facilitated.

In addition, the insertion of the pin device into the receiving space of the bushing portion of the bushing device is facilitated by the configuration of the expansion grooves that tapers conically in the axial direction at least in portions.

The fastening apparatus according to the disclosure is provided in particular for motor vehicles for the fastening of plate-like elements, such as paneling parts or cable harnesses. Furthermore, the pin portion can have a contour or can be contoured in cross-section, and the receiving space can be configured so as to correspond to this contour in cross-section, wherein a central portion of the pin device is approximately cylindrical, and wherein two expansion portions, which are approximately rectangular in cross-section and extend in the axial direction, are molded onto the cylindrical portion for expanding the expansion grooves.

The pin portion and the receiving space thus have cross-sections configured so as to approximately correspond to one another, so that the pin portion can be inserted into the receiving space according to the key/keyhole principle. The expansion portions of the pin portion facilitate the expansion of the bushing portion of the bushing device.

The fastening portions can be formed in an approximately half-shell shape in cross-section and preferably have retaining ribs extending in the axial direction. The retaining ribs can be approximately semi-circular in cross-section. Due to the clearances between the retaining ribs, the assembly force of the pin portion and thus the fastening apparatus can be reduced, because the soft component of the fastening portions can be displaced during the radial expansion into the clearances.

The bushing device can comprise at one end a flange portion for abutting against a carrier component, wherein the flange portion can comprise radially circumferential retaining edges. By means of the flange portion, a component can be fastened to a carrier component in a clamping manner, for example.

The pin device can comprise a lid portion onto which radially circumferential catching means are molded, which are configured so as to correspond to the retaining edges, and wherein the lid portion can be connected to the flange portion of the bushing device via the catching means and fixes the pin portion in the axial direction.

By providing a lid portion and/or connecting the pin device to the bushing device, an unintended release of the fastening apparatus from a carrier component is safely and reliably prevented, because the pin portion of the pin device is positionally fixed in the axial direction in the receiving space of the bushing portion of the bushing device. The bushing device and the pin device can be connected to one another integrally and in a hinged manner, preferably via a film hinge.

Due to the fact that the bushing device and the pin device are integrally connected to one another, the fastening apparatus can be delivered as an assembly to a user, and there is no risk of one of the two components being lost. In addition, assembly is facilitated by the integral connection of the bushing device and the pin device, in particular when these two components are hinged to one another via a hinge, in particular a film hinge, or also by the flexibility of a corresponding connecting portion between the bushing device and the pin device. The bushing portion of the bushing device can have a diameter of at least 3 mm to 6 mm, and preferably 3 mm to 5 mm.

The fastening apparatus according to the disclosure is thus particularly suitable for assembly in recesses with a particularly small diameter of a carrier component. Furthermore, the bushing portion can have a radially circumferential insertion slope at an end opposite the flange portion. By providing such an insertion slope, an introduction of the fastening apparatus into a recess of a carrier component is simplified.

The flange portion can have an annular sealing device on a side facing in the direction of the bushing portion for sealing abutment against a carrier component, wherein the sealing device is preferably formed integrally with the fastening portions. By means of the sealing device, the fastening apparatus can be configured so as to be water-tight or sealing against a recess of a carrier component.

The fastening apparatus can be produced from two different plastics by way of a two-component injection molding process, so that a bushing device and a pin device are formed from a first plastic component and fastening portions are formed from a second plastic component that is softer in comparison to the first plastic component.

Figure 6:
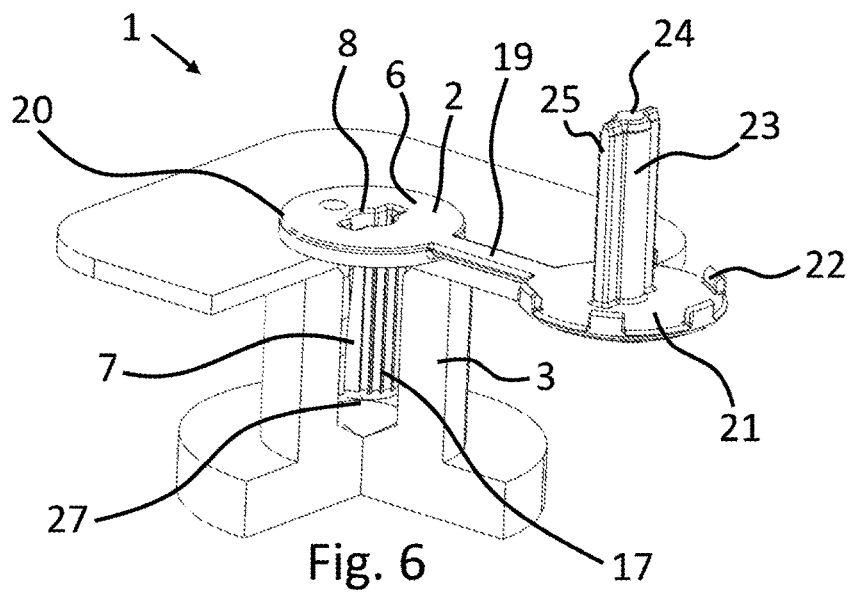
FIG. 6 illustrates a perspective view of the fastening apparatus according to the disclosure in a state when arranged in a recess of a carrier component or an intermediate fastening position with a component.
Figure 7:
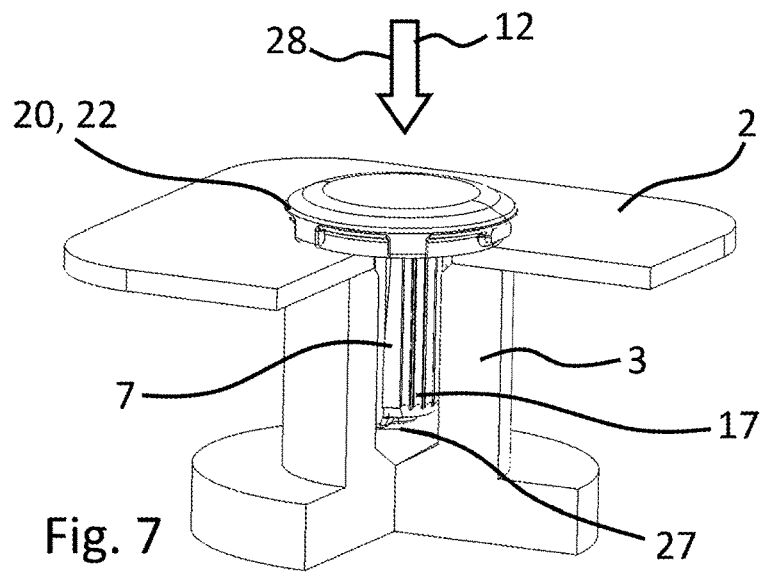
FIG. 7 illustrates the view from FIG. 6 in a final assembly position.

The fastening apparatus 1 according to the disclosure is described and illustrated in greater detail on the basis of a first exemplary embodiment of FIGS. 1 through 7. Specifically, FIGS. 1 and 2 illustrates, respectively, perspective views of a fastening apparatus according to the disclosure in a pre-assembly position and in a final assembly position, without the component and carrier component. FIG. 3 illustrates a perspective side-cut view of the fastening apparatus in a final assembly position mounted in a carrier component with a component fastened by means of the fastening apparatus. FIG. 4 illustrates a perspective view of the fastening portions of the fastening apparatus, while FIG. 5 illustrates a perspective view of the fastening apparatus according to the disclosure in a pre-assembly position. FIG. 6 illustrates a perspective view of the fastening apparatus according to the disclosure in a state when arranged in a recess of a carrier component or an intermediate fastening position with a component, while FIG. 7 illustrates the view from FIG. 6 in a final assembly position.

The fastening apparatus 1 is configured for fastening a component 2 to a carrier component 3. The fastening apparatus 1 comprises a bushing device 4 and a pin device 5. The bushing device 4 comprises at one end a flange portion 6, onto which a bushing portion 7 is integrally molded. An insertion opening 8 is configured in the flange portion 6. The insertion opening 8 opens into a receiving space 9 delimited by the bushing portion 7.

The receiving space 9 and the insertion opening 8 have a central circular portion 10 in cross-section, on which two expansion grooves 11, which are approximately rectangular and extend in the axial direction 12, are formed on diametrically opposed sides. The expansion grooves 11 are configured as recesses extending in the axial direction 12 in a casing wall of the bushing portion 7.

In a side view, the expansion grooves 11 can first have an approximately parallel linear portion 13, to which a conically tapering portion 14 is adjoined in an assembly direction, to which a further linear portion 15 is adjoined.

In the region between the expansion grooves 11, fastening portions 17, which extend in an axial direction 12 and are configured in an approximately half-shell shape in cross-section, are formed on an outer casing wall 16 of the bushing portion 7.

The fastening portions 17 are produced from a second plastic component which is softer in comparison to a first plastic component from which the bushing device 4 and the pin device 5 are formed.

At an end opposite the flange portion 6, the bushing device comprises a radially circumferential insertion slope 18. The insertion slope 18 is approximately conical in cross-section. Radially circumferential retaining edges 20 are formed on the flange portion 6. The flange portion 6 of the bushing device 4 is connected to a lid portion 21 of the pin device 5 via one or two connecting portions 19. The lid portion 21 comprises radially circumferential catching means 22 for connecting with the retaining edges 20 of the flange portion 6.

Furthermore, a pin portion 23 extending in the axial direction 12 is integrally molded onto the lid portion 21 of the pin device 5. The pin portion 23 is configured in cross-section so as to approximately correspond to the cross-section of the insertion opening 8 or the cross-section of the receiving space 9. Accordingly, the pin portion 23 and the receiving space 9 are configured according to a key/keyhole principle in a cross-section orthogonally to the assembly direction 28 or to a longitudinal direction.

The pin portion 23 comprises a cylindrical portion 24 extending in the axial direction 12, wherein two expansion portions 25, which are approximately rectangular in cross-section and extend in the axial direction 12, are molded onto the cylindrical portion 24.

Onto a side of the flange portion 6 facing in the direction of the carrier component 3, an annular sealing device 26 can be molded, which, like the fastening portions 17, is made from the second plastic component (soft component), which is softer than the first plastic component (hard component).

The fastening apparatus can be produced from two different plastics by way of a two-component injection molding process, so that a bushing device and a pin device are formed from a first plastic component and fastening portions are formed from a second plastic component that is softer in comparison to the first plastic component.

In the following, a method for assembling the fastening apparatus 1 according to the disclosure is briefly explained.

First, the bushing portion 7 of the fastening apparatus 1 is arranged in a recess 27 of a carrier component and, in particular in the axial direction 12 or in an assembly direction 28, is inserted linearly into the latter.

In the context of the present disclosure, an assembly direction 28 is defined as a direction in which the fastening apparatus is inserted into a recess 27 of a carrier component, wherein the assembly direction 28 extends orthogonally to a surface of a carrier component delimiting the recess 27.

The pin device is then folded 180 degrees in the direction of the bushing device 4, and the pin portion 23 is introduced into the receiving space 9 of the bushing portion in the assembly direction 28 or in the axial direction 12.

The expansion portions 25 of the pin portion slide in the expansion grooves 11 of the bushing portion, such that the fastening portions 17 are expanded or displaced outwardly in the radial direction.

In this way, the fastening portions formed from a soft component then abut against a recess of a carrier component and fix the fastening apparatus 1 in the recess 27 of the carrier component 3 due to the greater frictional forces.

According to the present disclosure, there is further provided a method of producing a fastening apparatus as described above, wherein the fastening apparatus is produced from two different plastics by way of a two-component injection molding process, so that a bushing device and a pin device are formed from a first plastic component and fastening portions are formed from a second plastic component that is softer in comparison to the first plastic component.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A fastening apparatus comprising:
   a bushing device having a bushing portion delimiting a receiving space for receiving a pin device;
   a pin device having a pin portion, wherein the bushing device and the pin device are formed from a first plastic component and are connected to one another integrally and in a hinged manner; and
   at least one fastening portion for radially abutting against a recess of a carrier component, wherein;
      each of the at least one fastening portions are formed on an outer casing wall of the bushing portion of the bushing device, and
      each of the at least one fastening portions are formed from a second plastic component that is softer in comparison to the first plastic component.

2. The fastening apparatus according to claim 1, wherein each of the at least one fastening portions can be exposed to a force acting outwardly in the radial direction by arranging the pin portion of the pin device in the receiving space of the bushing device.

3. The fastening apparatus according to claim 1, wherein the bushing portion of the bushing device comprises at least one expansion groove extending in an axial direction, wherein each of the at least one expansion grooves are at least partially configured so as to taper conically in the axial direction.

4. The fastening apparatus according to claim 3, wherein the pin portion has a contour in cross-section, and the receiving space is configured so as to correspond to the contour in cross-section, wherein a central portion of the pin device is approximately cylindrical, and wherein two expansion portions, which are approximately rectangular in cross-section and extend in the axial direction, are molded onto a cylindrical portion of the pin portion for expanding the expansion grooves.

5. The fastening apparatus according to claim 1, wherein each of the at least one fastening portions are formed in an approximately half-shell shape in cross-section.

6. The fastening apparatus according to claim 1, wherein the bushing device comprises at one end a flange portion for abutting against a carrier component, wherein the flange portion comprises radially circumferential retaining edges.

7. The fastening apparatus according to claim 6, wherein:
   the pin device comprises a lid portion onto which radially circumferential catching means are molded, which are configured so as to correspond to the retaining edges;
   the lid portion is configured to connect to the flange portion of the bushing device via the catching means; and
   the lid portion is configured to fix the pin portion of the pin device in an axial direction.

8. The fastening apparatus according to claim 1, wherein the bushing device and the pin device are connected to one another via a film hinge.

9. The fastening apparatus according to claim 1, wherein the fastening apparatus is produced from two different plastics by way of a two-component injection molding process, wherein a bushing device and a pin device are formed from a first plastic component and each of the at least one fastening portions are formed from a second plastic component that is softer in comparison to the first plastic component.

10. A method of producing a fastening apparatus from two different plastics by way of a two-component injection molding process, the method comprising:
   forming a bushing device and a pin device from a first plastic component, wherein:
      the bushing device comprises a bushing portion delimiting a receiving space for receiving a pin device,
      the pin device comprises a pin portion, and
      the bushing device and the pin device are connected to one another integrally and in a hinged manner; and
   forming at least one fastening portion on an outer casing wall of the bushing portion of the bushing device, wherein:
      each of the at least one fastening portions are configured to radially abut against a recess of a carrier component, and
      each of the at least one fastening portions are formed from a second plastic component that is softer in comparison to the first plastic component.

11. The fastening apparatus according to claim 1, wherein the outer casing wall comprises two diametrically opposed fastening portions.

12. The fastening apparatus according to claim 11, wherein:
   the bushing portion of the bushing device comprises two diametrically opposed expansion grooves; and
   the two diametrically opposed expansion grooves are arranged in a region between the two diametrically opposed fastening portions.

13. The fastening apparatus according to claim 2, wherein each of the at least one fastening portions extends in an axial direction.

14. The fastening apparatus according to claim 3, wherein the bushing portion of the bushing device comprises two diametrically opposed expansion grooves.

15. The fastening apparatus according to claim 5, wherein each of the at least one fastening portions have retaining ribs extending in an axial direction.

16. The fastening apparatus according to claim 8, wherein the bushing device and the pin device are connected to one another via a film hinge.

* * * * *